United States Patent
Wu (10) Patent No.: US 8,923,251 B2
(45) Date of Patent: Dec. 30, 2014

(54) METHOD OF HANDLING UPLINK TIME ALIGNMENT

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 87 days.

(21) Appl. No.: 13/427,868

(22) Filed: Mar. 22, 2012

(65) Prior Publication Data

US 2012/0243514 A1 Sep. 27, 2012

Related U.S. Application Data

(60) Provisional application No. 61/466,946, filed on Mar. 24, 2011.

(51) Int. Cl.
*H04J 3/00* (2006.01)
*H04W 56/00* (2009.01)
*H04W 74/08* (2009.01)
*H04L 5/00* (2006.01)

(52) U.S. Cl.
CPC ...... *H04W 56/0045* (2013.01); *H04W 74/0833* (2013.01); *H04L 5/001* (2013.01); *H04L 5/0053* (2013.01)
USPC .......................... 370/336; 370/252; 455/450

(58) Field of Classification Search
CPC .............................. H04W 72/04; H04W 74/08
USPC ................. 370/328–339, 252–253, 350–356; 455/450, 502
See application file for complete search history.

(56) References Cited

U.S. PATENT DOCUMENTS

| 8,665,857 | B2 | 3/2014 | Meylan | |
|---|---|---|---|---|
| 2010/0296467 | A1 | 11/2010 | Pelletier et al. | |
| 2011/0038361 | A1 | 2/2011 | Park et al. | |
| 2011/0243009 | A1* | 10/2011 | Chandrasekhar et al. | 370/252 |
| 2012/0008600 | A1* | 1/2012 | Marinier et al. | 370/336 |
| 2012/0082107 | A1* | 4/2012 | Ou et al. | 370/329 |

FOREIGN PATENT DOCUMENTS

| CN | 101904212 A | 12/2010 |
|---|---|---|
| CN | 101946425 A | 1/2011 |
| TW | 201110764 | 3/2011 |
| WO | 2010079941 A2 | 7/2010 |

OTHER PUBLICATIONS

3GPP TS 36.321 V10.0.0 3rd Generation Partnership Project; Technical Specification Group Radio Access Network; Evolved Universal Terrestrial Radio Access (E-UTRA); Medium Access Control (MAC) protocol specification (Release 10), Dec. 2010.

(Continued)

*Primary Examiner* — Ricky Ngo
*Assistant Examiner* — Iqbal Zaidi
(74) *Attorney, Agent, or Firm* — Winston Hsu; Scott Margo (57) ABSTRACT

A method of handling uplink time alignment for a communication device in a wireless communication system is disclosed. The method comprises being configured a primary cell and at least a secondary cell by a network of the wireless communication system, transmitting a random access preamble of a random access procedure on the secondary cell when one of the at least a secondary cell is activated, and receiving a random access response including a timing advance command for the secondary cell on the primary cell, the secondary cell, or another one of the at least a secondary cells.

8 Claims, 6 Drawing Sheets

(56) References Cited

OTHER PUBLICATIONS

3GPP RP-110451, 3GPP TSG RAN Meeting #51, LTE Carrier Aggregation Enhancements, Mar. 15, 2011.

Office action mailed on Apr. 3, 2014 for the China application No. 201210082419.7, filed Mar. 26, 2012.

Office action mailed on Aug. 18, 2014 for the Taiwan application No. 101110127, filed: Mar. 23, 2012, p. 1-9.

* cited by examiner

Bitmap

| C7 | C6 | C5 | C4 | C3 | C2 | C1 | C0 |
|---|---|---|---|---|---|---|---|
| R | R | \multicolumn{6}{c|}{Timing advance command} |

| | | | | | | | |
|---|---|---|---|---|---|---|---|
| R | R | Timing advance command ||||||
| R | R | Timing advance command ||||||
| R | R | Timing advance command ||||||
| R | R | Timing advance command ||||||
| | | | | | | | |
| R | R | Timing advance command ||||||

FIG. 6A

| Index | 0 | Timing advance command |
| | Index | 1 | Timing advance command |
| | | Index | 2 | Timing advance command |
| Timing advance command | ........ |

FIG. 6B

METHOD OF HANDLING UPLINK TIME ALIGNMENT

CROSS REFERENCE TO RELATED APPLICATIONS

This application claims the benefit of U.S. Provisional Application No. 61/466,946, filed on Mar. 24, 2011 and entitled "Method and Apparatus for handling multiple timing advances in a wireless communication system", the contents of which are incorporated herein in their entirety.

BACKGROUND OF THE INVENTION

1. Field of the Invention

The application relates to a method utilized in a wireless communication system, and more particularly, to a method of handling uplink time alignment in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

According to structure of the LTE system, time alignment (TA) functionality allows a user equipment (UE) with a component carrier to be synchronized with a serving base station on uplink timing for preventing signals transmitted from the UE from colliding with those sent from other UEs under the coverage of the base station. In the TA functionality, the UE has to maintain a time alignment timer whose running state indicates that uplink transmission is still synchronized. The network controls the TA functionality of the UE with a timing advance command. In detail, the network uses a MAC Protocol Data Units (MAC PDU) to transmit the timing advance command to the UE. A MAC PDU consists of a MAC header, zero or more MAC Service Data Units (MAC SDU), zero, or more MAC control elements, and optionally padding. A MAC PDU header consists of one or more MAC PDU subheaders, and each subheader corresponds to either a MAC SDU, a MAC control element or padding. A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

Moreover, MAC PDU subheaders have the same order as the corresponding MAC SDUs, MAC control elements and padding. In addition, the MAC control elements are always placed before any MAC SDU. Padding occurs at the end of the MAC PDU. Note that, a MAC control element carrying the timing advance command is called a timing advance command MAC control element, and is identified by a MAC PDU subheader with a LCID.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and transmitting. In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Note that, the PCell (i.e. the UL and DL PCC) is always activated, whereas the SCell may be activated or deactivated according to specific conditions (e.g. an amount of data for transmission). The UE shall not monitor the physical downlink control channel (PDCCH) of a deactivated SCell and shall not receive any downlink assignments or uplink grants associated to a deactivated SCell. The UE shall not transmit on UL-SCH on a deactivated SCell. In addition, the network activates and deactivates the SCell by sending the Activation/Deactivation command.

According to the prior art, it is possible to configure a UE of a PCell and one SCell or more SCells. Therefore, multiple timing advances are needed for PCell and SCell or more SCells in different bands. To get a multiple timing advance for a configured SCell, the UE performs a random access procedure by transmitting a preamble on the configured SCell. However, the LTE-Advanced system does not clearly specify from where (e.g. PCell or which SCell) the UE should receive a random access response including a timing advance command. Furthermore, the LTE-Advanced system does not clearly specify how to handle the configured SCell when the UE fails to complete the random access procedure.

A conventional MAC control element contains one timing advance command for updating uplink timing of a UE in RRC connected mode. When the UE receives the conventional MAC control element, the UE does not know which cell (e.g. PCell or SCell) the timing advance command should be applied. Besides, if a network wants to update uplink timing for the uplink component carriers (i.e. 5 component carriers), the network has to send 5 MAC control elements in 5 MAC PDUs, which is not efficient.

SUMMARY OF THE INVENTION

The application discloses a method of handling uplink time alignment in a wireless communication system to solve the abovementioned problems.

A method of handling uplink time alignment for a communication device in a wireless communication system is disclosed. The method comprises being configured a primary cell and at least one secondary cell by a network of the wireless communication system, transmitting a random access preamble of a random access procedure on one of the at least one secondary cell when the one of the at least one secondary cell is activated, and receiving a random access response including a timing advance command on the primary cell, the one of the at least one secondary cell or another one of the at least one secondary cell.

A method of handling uplink time alignment for a network of a wireless communication system is disclosed. The method comprises configuring a plurality of component carriers to a communication device of the wireless communication system, and including a plurality of timing advance commands for updating uplink timing of the plurality of component carriers in one medium access control protocol data unit, hereafter called MAC PDU, with a plurality of indices for the plurality of component carriers, wherein each index of the plurality of indices for indicating which timing advance command is applied to which component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
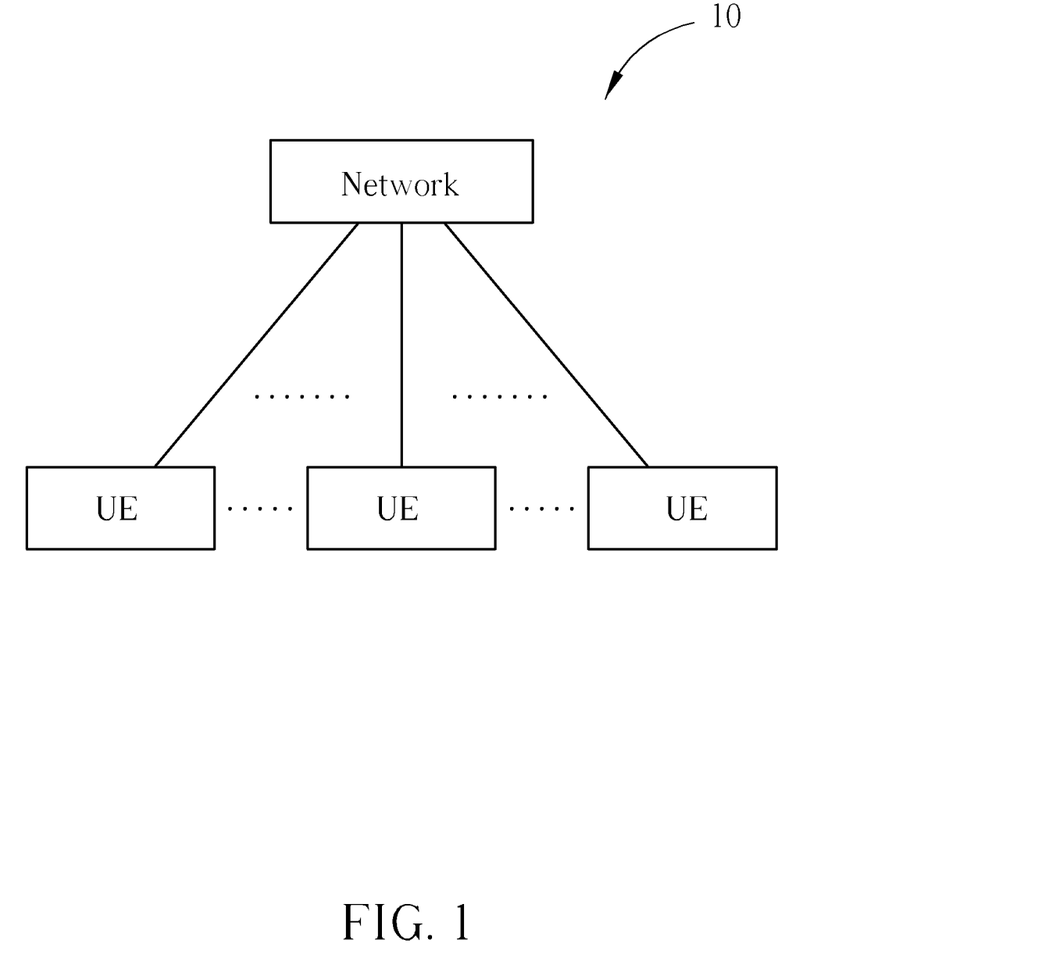
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-Advanced) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
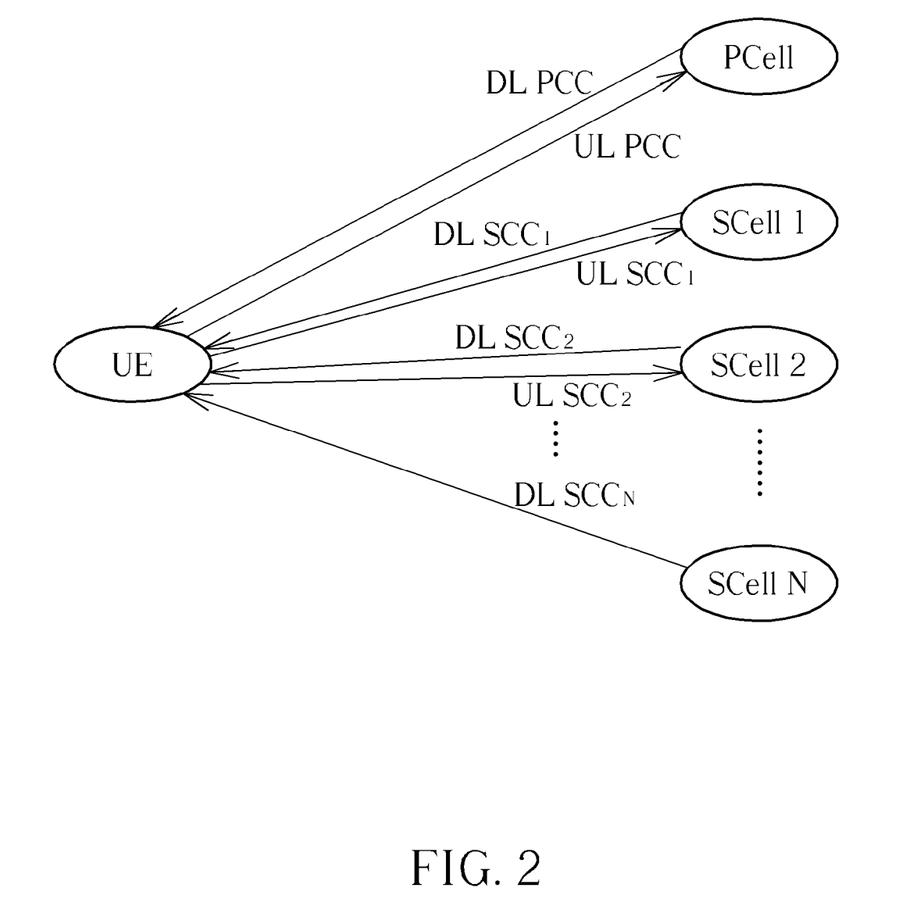
FIG. 2 is a schematic diagram of a user equipment and multiple cells in a wireless communication system in FIG. 1.

Please refer to FIG. 2, which is a schematic diagram of a UE and multiple cells in the wireless communication system 10. The UE communicates with one primary cell (PCell) and several secondary cells (SCells), as SCell 1-SCell N shown in FIG. 2. In the downlink, the component carrier corresponding to the PCell is the downlink primary component carrier (DL PCC) while in the uplink it is the uplink primary component carrier (UL PCC). Depending on UE capabilities, SCells can be configured to form together with the PCell a set of serving cells. In the downlink, the component carrier corresponding to a SCell is a downlink secondary component carrier (DL SCC) while in the uplink it is an uplink secondary component carrier (UL SCC).

Figure 3:
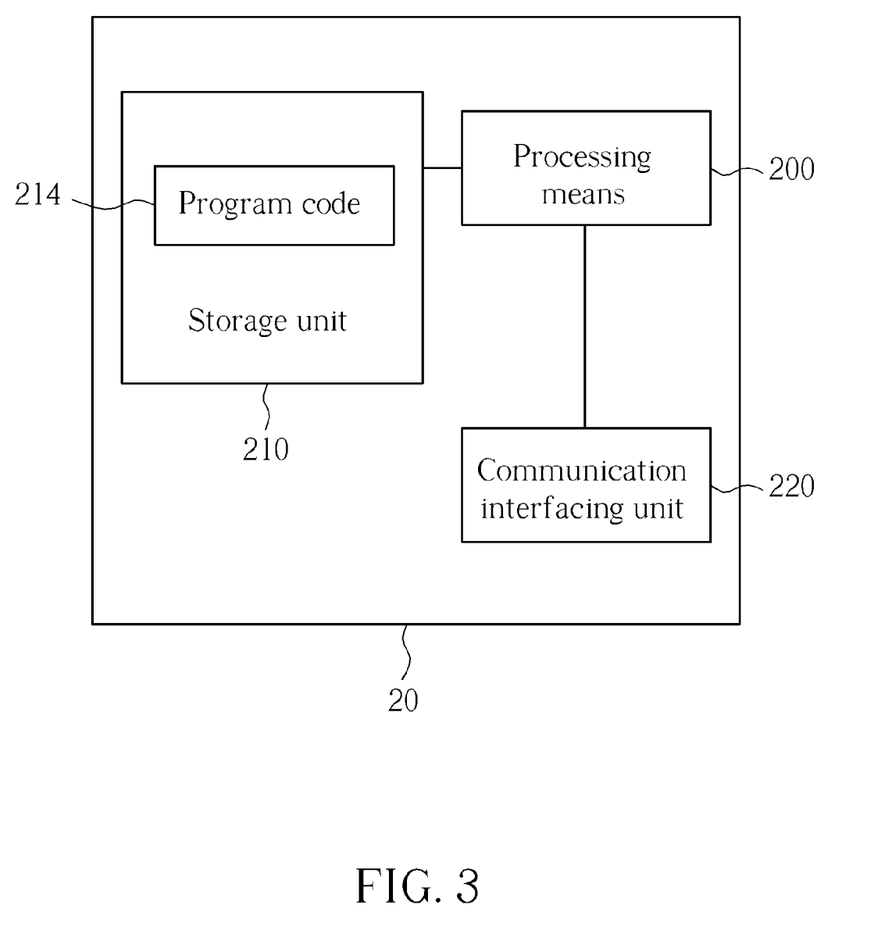
FIG. 3 illustrates a schematic diagram of an exemplary communication device.

FIG. 3 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network (i.e. PCell or SCell 1-SCell N) according to processing results of the processing means 200.

Figure 4:
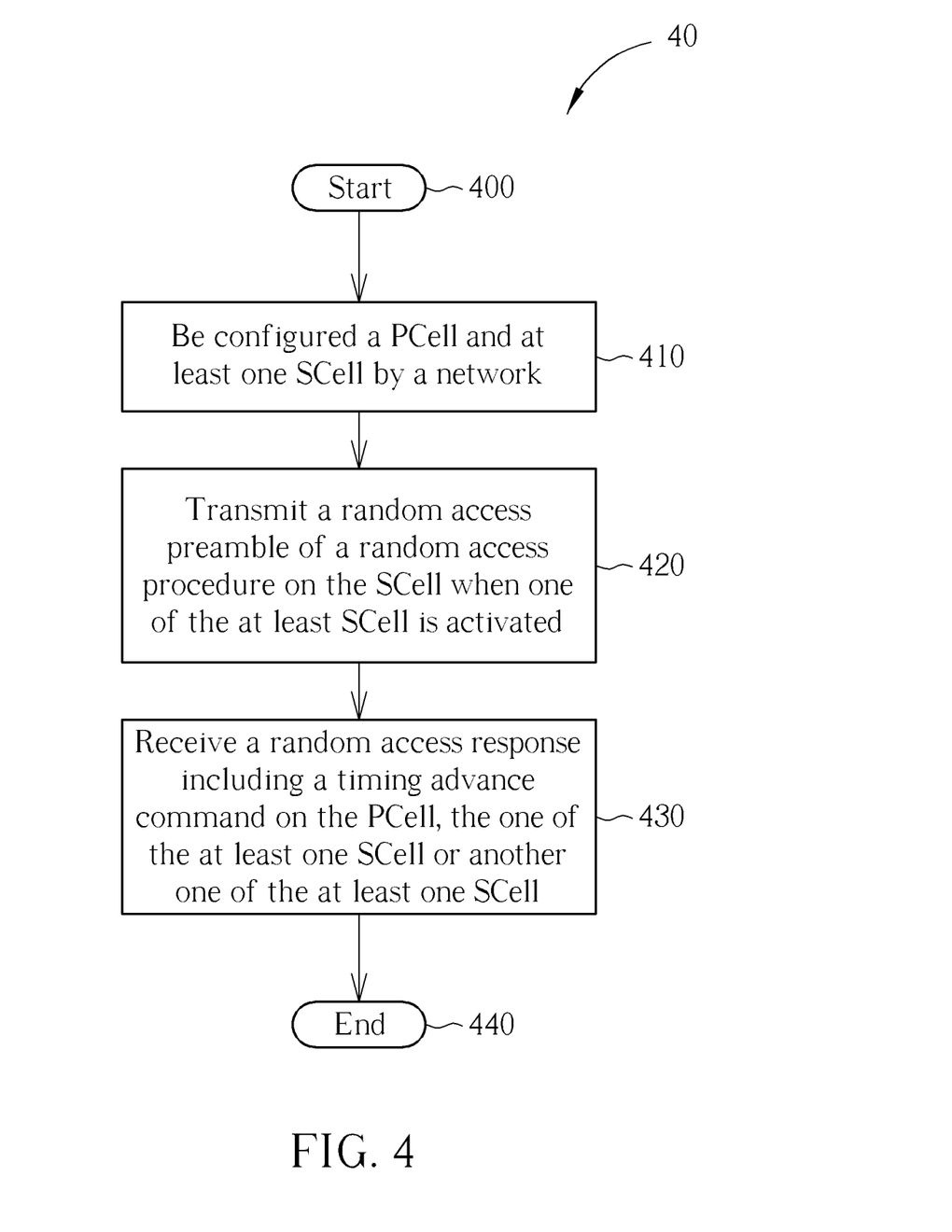
FIG. 4 is a flowchart of an exemplary process.

Please refer to FIG. 4, which illustrates a flowchart of an exemplary process 40. The process 40 is utilized in a UE for handling uplink time alignment. The process 40 can be compiled into the program code 214 and includes the following steps:

Step 400: Start.

Step 410: Be configured a PCell and at least one SCell by a network.

Step 420: Transmit a random access preamble of a random access procedure on the SCell when one of the at least SCell is activated.

Step 430: Receive a random access response including a timing advance command on the PCell, the one of the at least one SCell or another one of the at least one SCell.

Step 440: End.

According to the process 40, the network (i.e. eNB) configures the UE of PCell and one or more SCells, wherein the configured SCells is deactivated. When the network activates one of the SCells, the UE transmits a random access preamble on the SCell to initiate a random access procedure for acquiring uplink timing of the SCell. After that, the UE receives a random access response including a timing advance command of the SCell either on the PCell, the SCell or another one of the configured SCells. The one of the configured SCells can be a SCell scheduling data on the SCell. The reception of the random access response either on the PCell, the SCell or another one of the configured SCells can be configured by RRC or predetermined. With process 40, the UE knows where to receive the random access response including the timing advance command for uplink time alignment.

Take an example based on the process 40. Referring back to FIG. 2, the UE is configured with the PCell, and SCell 1-N by a radio resource control message (e.g. RRC connection reconfiguration message) and the SCell 1-N is deactivated. When the UE receives an activation command for activating the SCell 1 from the network, the UE transmits a random access preamble on the SCell 1. Note that, the UE receives a random access response of the random access procedure on the SCell 1, the PCell or another one of the configured SCells (e.g. SCell 2-N in FIG. 2). The random access response includes a timing advance command of the SCell 1, so that the UE can apply the timing advance command to implement uplink time alignment.

Note that, in an embodiment, the UE may transmit the random access preamble on the SCell 1 when the activation command or the RRC connection reconfiguration message indicates the UE to acquire uplink timing of the SCell 1. In addition, the random access preamble may be a dedicated preamble configured by a PDCCH order, a RRC message (e.g. RRC connection reconfiguration message) or the activation command. In addition, the network may configure a dedicated preamble used for acquiring uplink timing of a plurality of SCells (i.e. SCells 1-N) or configure a dedicated preamble per SCell (namely the network may configure different dedicated preambles for the SCells).

Further, if the UE cannot perform the random access procedure successfully (e.g. reach the maximum number of random access preamble transmission), the UE may deactivate the SCell 1.

Figure 5:
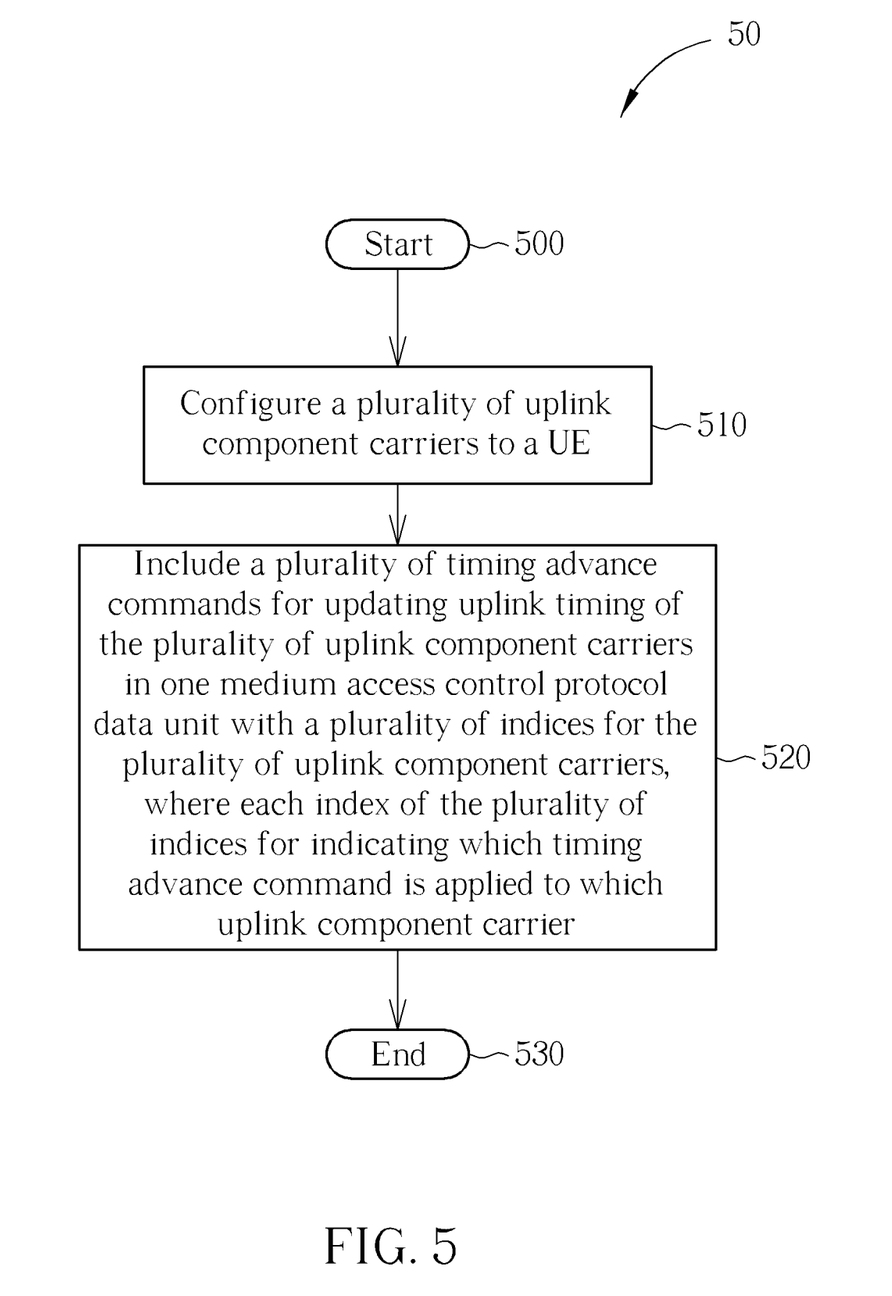
FIG. 5 is a flowchart of an exemplary process.

Please refer to FIG. 5, which illustrates a flowchart of an exemplary process 50. The process 50 is utilized in a network for handling uplink time alignment. The process 50 can be compiled into the program code 214 and includes the following steps:

Step 500: Start.

Step 510: Configure a plurality of uplink component carriers to a UE.

Step 520: Include a plurality of timing advance commands for updating uplink timing of the plurality of uplink component carriers in one medium access control protocol data unit with a plurality of indices for the plurality of uplink component carriers, where each index of the plurality of indices for indicating which timing advance command is applied to which uplink component carrier.

Step 530: End.

According to the process 50, a medium access control protocol data unit, hereafter called MAC PDU, containing multiple timing advance commands is provided. In addition, the MAC PDU includes indices where each of the indices for indicating which timing advance command is applied to which component carrier. The value of each of the indices is configured by the network before the network transmits the MAC PDU. By including multiple timing advance commands in one MAC PDU, the network does not need to send multiple MAC PDUs where each include a timing advance command to the UE, so as to increase efficiency of updating uplink timing for multiple component carriers.

Moreover, after the UE receives the MAC PDU, the UE updates the uplink timing of each of the plurality of uplink component carriers based on each index and timing advance command. Note that, the UE may receive a RRC message (e.g. RRC connection reconfiguration message) configuring the UE that the multiple timing advance commands in a MAC PDU are used for updating the uplink timing for the plurality of uplink component carriers. The plurality of timing advance commands may be grouped into a new MAC control element format and the UE may receive a RRC message configuring the UE that the new MAC control element is used for updating the uplink timing.

Figure 6A:
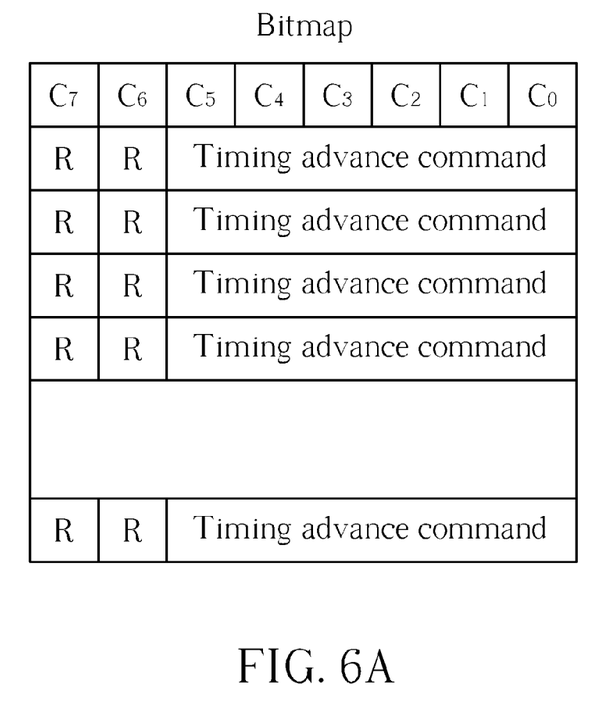
FIG. 6A-6B illustrate schematic diagrams of a format of timing advance commands.
Figure 6B:
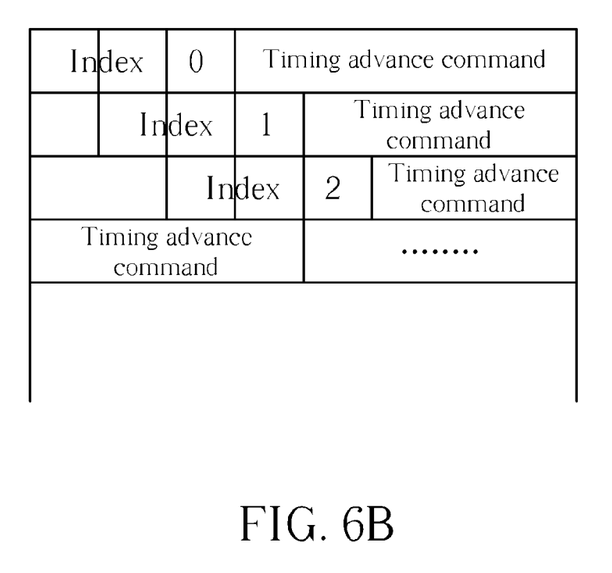

In detail, please refer to FIG. 6A-6B, which are schematic diagrams of a format of multiple timing advance commands. In FIG. 6A, the indices are expressed as a bitmap with bit $C_0$, $C_1$ and so on. If the bit of "$C_0$" is 1, there is a corresponding timing advance command included for updating uplink timing of a first uplink component carrier; whereas if the bit of "$C_0$" is 0, no timing advance command is included for updating uplink timing of the first component carrier. For example, if the bit of "$C_0$" is 0, and the bit of "$C_1$" is 1, the timing advance command in the second row is used for updating uplink timing of the second uplink component carrier. On the other hand, an index may be put ahead of a timing advance command with one or several bits. In FIG. 6B, the index is expressed by a 3-bit value. The UE determines to apply the timing advance command immediately following index "0" to which component carrier based on a value of index "0". Similarly, the UE determines to apply the timing advance command immediately following index "1" to which component carrier based on a value of index "1". As can be seen, multiple timing advance commands included in one MAC PDU is provided in the present invention. The index can be expressed by an n-bit value, where "n" depends on the maximum number of timing advance commands can be transmitted to the UE.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides methods for handling uplink time alignment, so as to receive a timing advance command for a SCell, and increase efficacy of transmission of multiple timing advance commands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling uplink time alignment for a communication device in a wireless communication system, the method comprising:

being configured a primary cell and at least one secondary cell by a network of the wireless communication system;

transmitting a random access preamble of a random access procedure on a secondary cell of the at least one secondary cell when the secondary cell of the at least one secondary cell is activated; and receiving a random access response including a timing advance command for the secondary cell on the primary cell or one of the at least one secondary cell;

wherein the random access preamble is a dedicated preamble configured by the network with a physical downlink control channel (PDCCH) order, a radio resource control (RRC) message or an activation command and the RRC message or the activation command indicates the communication device to acquire uplink timing of the secondary cell.

2. The method of claim 1, wherein the dedicated preamble is used for acquiring uplink timing of a plurality of activated secondary cells or only for the secondary cell.

3. The method of claim 1, further comprising:

deactivating the secondary cell when the random access procedure is not successfully performed.

4. A method of handling uplink time alignment for a network of a wireless communication system, the method comprising:

configuring a plurality of uplink component carriers corresponding to a primary cell and at least one secondary cell to a communication device of the wireless communication system; and including a plurality of timing advance commands for updating uplink timing of the plurality of uplink component carriers in one medium access control protocol data unit, hereafter called MAC PDU, with a plurality of indices for the plurality of uplink component carriers, where each index of the plurality of indices indicates which timing advance command is applied to which uplink component carriers;

wherein the communication device transmits a random access preamble of a random access procedure on a secondary cell of the at least one secondary cell when the secondary cell is activated, wherein the random access preamble is a dedicated preamble configured by the network with a physical downlink control channel (PDCCH) order, a radio resource control (RRC) message or an activation command and the RRC message or the activation command indicates the communication device to acquire uplink timing of the secondary cell.

5. The method of claim 4, further comprising:
transmitting the MAC PDU to the communication device for updating the uplink timing of the plurality of uplink component carriers.

6. The method of claim 4 further comprising:
transmitting the radio resource control (RRC) message configuring that the MAC PDU is used for updating the uplink timing of the plurality of uplink component carriers, to the communication device.

7. A method of handling uplink time alignment for a communication device in a wireless communication system, the method comprising:
being configured a plurality of uplink component carriers corresponding to a primary cell and at least one secondary cell by a network of the wireless communication system;
receiving a medium access control protocol data unit, hereafter called MAC PDU, including a plurality of timing advance commands for updating uplink timing of the plurality of uplink component carriers, and with a plurality of indices for the plurality of uplink component carriers, where each index of the plurality of indices indicates which timing advance command is applied to which uplink component carrier; and
updating uplink timing of each of the plurality of uplink component carriers according to each index and timing advance command;
wherein the communication device transmits a random access preamble of a random access procedure on a secondary cell of the at least one secondary cell when the secondary cell is activated, wherein the random access preamble is a dedicated preamble configured by the network with a physical downlink control channel (PDCCH) order, a radio resource control (RRC) message or an activation command and the RRC message or the activation command indicates the communication device to acquire uplink timing of the secondary cell.

8. The method of claim 7 further comprising:
receiving the radio resource control (RRC) message configuring that the MAC PDU is used for updating the uplink timing of the plurality of uplink component carriers.

\* \* \* \* \*